US008229501B2

(12) United States Patent
Struthers et al.

(10) Patent No.: US 8,229,501 B2
(45) Date of Patent: *Jul. 24, 2012

(54) COMPUTER WALL DOCKING STATION (75) Inventors: Scott Struthers, San Clemente, CA (US); Geoff Spencer, San Juan Capistrano, CA (US); Ari Supran, San Clemente, CA (US); Ray Call, Mission Viejo, CA (US); Kim Anthony Parker, Oceanside, CA (US)

(73) Assignee: Dana Innovations, San Clemente, CA (US)

( * ) Notice: Subject to any disclaimer, the term of this patent is extended or adjusted under 35 U.S.C. 154(b) by 226 days.

This patent is subject to a terminal disclaimer.

(21) Appl. No.: 12/357,286

(22) Filed: Jan. 21, 2009

(65) Prior Publication Data
US 2009/0174998 A1 Jul. 9, 2009

Related U.S. Application Data (63) Continuation-in-part of application No. 11/585,039, filed on Oct. 23, 2006, now Pat. No. 7,493,142, which is a continuation of application No. 10/936,975, filed on Sep. 9, 2004, now Pat. No. 7,155,214.

(51) Int. Cl.
*H04M 1/00* (2006.01)

(52) U.S. Cl. .................................................. 455/556.1

(58) Field of Classification Search .................. 370/469, 370/237, 343, 453, 392, 329, 252, 310, 520, 370/401, 450, 452.2, 241, 408, 328, 235, 370/230.1, 331, 260, 389, 254, 340, 336, 370/242, 232; 455/450, 452.2, 509, 464, 455/67.11, 411, 453, 67.13, 422.1, 2.01, 455/3.01, 420, 517, 186.1, 352, 3.03, 556.1, 455/444, 426.2; 709/208, 251, 201, 94, 231, 709/246; 381/81, 85, 77, 386, 30, 59, 89, 381/332, 96, 24, 111, 116–117; 340/3.71, 340/825.25, 426.34; 984/313, 362; 181/199
See application file for complete search history.

(56) References Cited

U.S. PATENT DOCUMENTS

| 6,101,087 | A | 8/2000 | Sutton et al. |
| 6,504,710 | B2 | 1/2003 | Sutton et al. |
| 6,658,384 | B2 | 12/2003 | Swinney |
| 6,764,373 | B1 * | 7/2004 | Osawa et al. ............... 446/175 |
| 6,993,289 | B2 * | 1/2006 | Janik ............................ 455/41.2 |
| 7,139,168 | B2 | 11/2006 | DeLuga et al. |
| 2004/0267390 | A1 * | 12/2004 | Ben-Yaacov et al. ........... 700/94 |
| 2008/0154446 | A1 | 6/2008 | Rui et al. |
| 2008/0304688 | A1 * | 12/2008 | Kumar ........................ 381/370 |

* cited by examiner

*Primary Examiner* — Melody Mehrpour
(74) *Attorney, Agent, or Firm* — Fish & Associates, PC (57) ABSTRACT

A wall-mounted docking station for a portable computer connects the portable computer to a media entertainment system. The media entertainment system can have multiple zones throughout a room and/or a building, and can play audio, video, images, or other media stored on the portable computer to any zone or a combination of zones. Preferably, the docking station also provides power to the portable computer, and could optionally provide both power and data connectivity over a power line.

16 Claims, 9 Drawing Sheets

COMPUTER WALL DOCKING STATION

This application is a continuation-in-part of allowed U.S. utility application with the Ser. No. 11/585,039, which was filed on Oct. 23, 2006, now U.S. Pat. No. 7,493,142, which is a continuation of U.S. utility application with the Ser. No. 10/936,975, which was filed on Sep. 9, 2004, and issued as U.S. Pat. No. 7,155,214. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is docking stations.

BACKGROUND OF THE INVENTION

Portable computers have long been used for storage and playback/creation of music, video, still images, and other forms of data. As used herein, "portable computers" include laptops, a variety of portable media players (e.g., the iPod™ and iPhone™ devices manufactured by Apple™, Inc.), cellular phones, and portable video players. Portable computers are generally used for ease of portability and to enable users to access data files while away from home. In practice, however, portable computers only allow outputting of data files to a single room/zone, typically through headphones, built-in speakers and/or a built-in display.

Portable computers can also be considered lifestyle devices, which facilitate the convenient transportation of data from one source/player to another, and allow local output of music, video, and other media through associated headphones and/or built-in monitors. In general, data is uploaded to portable computer by connection to a data source, typically a desktop computer. Once the data is loaded on to the portable computer, the data is downloaded (played) through headphones. For example, the iPod™ has a built-in monitor and headphone port to allow for single zone/room audio/video distribution.

While portable computers are useful to record and play media, these computers fail to take advantage of the portability and other features of the computer as a source of high quality music and video. In addition, these single-zone audio systems are also typically characterized by computer-specific docking stations connected to a local amplification/speaker distribution system.

The evolution of home entertainment systems has seen the introduction of sophisticated digital signal processors, adapted to interface with a wide range of audio/video equipment, and controllers therefore. Such equipment includes the Sonance Model DAB 1 audio controller/amplifier, the Sonance Navigator Harbor switch and the Sonance Navigator K1 and K2 controllers, marketed by Dana Innovations. Such equipment allows for selective distribution of audio programming about a multi-zone system, with local zone controllers operative to regulate local, remote or system wide operation. The distribution of such controllers about the audio system allows for distributed control of the audio system from any zone.

A useful enhancement to contemporary audio/video systems would be an apparatus which allows the flexibility, sophistication and audio/video reproduction quality of multi-zone media systems to be merged with the convenience and portability of portable computers. In this manner, the lifestyle qualities of the portable computer can be used to enhance the enjoyment of the multi-zone media entertainment system. In addition, because many contemporary portable computers have unique shapes or electrical interfaces, there is a need in the art to interface the portable computers to the entertainment system in order to accommodate different portable computers, both mechanically and electrically.

Additionally, there is a need in the art to provide a device which can readily interface with a variety of different portable computers without the need for a computer-specific electrical interface and control system. There is also a need for infrared (IR) or radio frequency (RF) control systems that respond to signals from various receiver locations to regulate operation of the portable computer, whether disposed locally or remote from a user and without the need for development of a unique electrical interface or any modification of the device's circuitry.

Further, there is a need for an interface that is wall mountable to facilitate convenient viewing of the portable computer and facilitate access to manual controls of the portable computer.

It is further desirable that the multi-zone entertainment system allow for engagement to a plurality of portable computers, whereupon audio and/or video inputs from each of the portable computers are selectively communicated to different zones of the multi-zone entertainment system, for simultaneous distribution of different audio/video programming to different audio/video zones.

The present invention is directed to achieving these and other goals within a simple, configurable device that consumes no table space and can be architecturally compatible with flush-mounted in-wall/in-ceiling audio and video systems.

BRIEF SUMMARY OF THE INVENTION

The inventive subject matter provides apparatus, systems and methods in which a portable computer couples to a multi-zone media entertainment system. The system includes a multi-zone media entertainment system controller having a media input/output selection circuit for controlling the source and distribution of audio and video signals. As used herein, "media" includes audio systems, video systems, and a combination of audio and video systems. The multi-zone system can compose a plurality of docking stations that are shaped and configured to receive portable computers, although it contemplated that a single docking station could be connected to multiple zones.

A contemplated docking station facilitates connection of a portable computer to the multi-zone media entertainment system. The docking station could include a wall-mount configured to receive the computer and a power connector configured to power the computer. The wall-mount for the docking station also attaches the docking station to a wallboard. As used herein, the term "wallboard" should be construed broadly to mean any sort of mechanical barrier for surfacing walls. Wallboards can be made of any suitable material, including for example plywood, plaster, wood, wood pulp, or gypsum. In one embodiment, the wall-mount includes a mounting frame and a plurality of engaging members connectable to the mounting frame for securing the docking station in a flush mount engagement with the wallboard. The docking station could mount to a wallboard by plugging into a power outlet in the wall. In a preferred embodiment, the docking station includes a power outlet.

The docking station could also have a first interface that sends/receives data between the docking station and the portable computer and a second interface that sends/receives data between the docking station and the media entertainment system. As used herein, "data" is any electronic communication that could be transferred from a personal computer including for example, audio files, video files, image files, database structures, tables, log files, data streams, instructions, commands, macros, and queries. Thus, in combination the first and second interfaces facilitate communication of data between the portable computer and the media entertainment system. While the first and second interfaces could communicate to intermediary devices that are coupled to the portable computer and the media entertainment system, the first and second interfaces preferably communicate directly with the portable computer and the media entertainment system.

A power connector coupled to the docking station could provide both power and data connectivity to the portable computer, for example by using IP over power line technology. In this manner, less hard-wiring is needed to couple the computer to the entertainment system. Using a power line with the dual ability to provide power and data connectivity, a media entertainment system plugged into a local power conduit could communicate with the docking station over the power line.

In one embodiment, at least one of the power connector, the first interface, and the second interface is hard-wired to at least one of the computer and the media entertainment system. Preferably, at least two of the power connector, the first interface, and the second interface are hard-wired to at least one of the computer and the media entertainment system. As used herein, "hard-wired" is defined as a direct or indirect physical connection of two devices. For example, hard-wired can include a direct wired connection that connects two devices, as well as an indirect wired connection from a first device to an intermediary device that is hard-wired to a second device. Thus, in one aspect, a wire or other cable including for example, an RS-232 cable can physically connect the second interface to the media entertainment system.

In addition to hard-wiring, it is also contemplated that at least one of the power connector, the first interface, and the second interface can have a wireless connection to at least one of the computer and the media entertainment system. As used herein, "wireless" is defined to include any connection between two devices having at least some portion lacking a "hard-wired" connection to the other portion. For example, the power connector can have a hard-wired connection to a power source but wirelessly transmit current to the portable device through induction. Or the first interface could be hard-wired to the portable computer, and the second interface could transmit data to and from a media entertainment system wirelessly. Any commercially suited wireless interface could be used. Preferably, wireless connections are programmable to receive commands from at least two different devices, for example remote controls manufactured by competing media system companies.

It is contemplated that any combination of hard-wired and wireless connections can be used to connect any of the power connector, the first interface, and the second interface to any of the computer and the media entertainment system.

The first interface can include any commercially available interface that facilitates the receipt of data stored within the computer. A preferred first interface includes a proprietary interface, for example an iPod™ interface or a BlackBerry™ interface. As used herein, a "proprietary interface" is defined as an interface licensed under the control of a company or other third party. It is preferred that the first interface comprises both a male and a mating female connector.

The second interface could include any commercially available interface and electronics that facilitate the communication of the data received from the computer to the media entertainment system. Contemplated second interfaces include both wired and wireless connections, and a wired/wireless combination. It is also contemplated that the docking station has electronics that allow it to communicate with the media entertainment system over a distance of at least 5 meters. Separating the docking station from the entertainment system by at least 5 meters is advantageous for media entertainment systems comprising multiple zones and components. Unless a contrary intent is apparent from the context, all ranges recited herein are inclusive of their endpoints, and open-ended ranges should be interpreted to include only commercially practical values.

As used herein, a portable computer can include any portable device capable of storing and playing audio/video, and having an output to allow connection to a first interface, as described above. Contemplated portable computers include laptop computers, netbooks, tablet PCs, MP3 players and other portable audio players, personal video players, cellular phones, personal digital assistants, and combinations thereof. The portable computer is preferably battery-powered. It is also contemplated that the computer has hardware and electronics capable of communicating with a cellular network. This capability could be built-in to the computer (e.g., a cellular phone), or added, for example with a USB adapter or a serial connection.

In another embodiment, the docking station has a third interface that provides additional functionality to the docking station. For example the third interface could allow the docking station (and any peripherals attached to the docking station including the portable computer) to communicate with a phone network such as a cellular or landline phone network through a hard-wired or wireless connection. The third interface could also include the ability to receive commands from a remote controller, typically using an infrared or radio frequency. This is advantageous as it allows a user to remotely control the computer while the computer is docked within the wall-mount without requiring the user to physically interact with the portable computer.

In other contemplated embodiments, the docking station includes a processor as well as built-in memory to facilitate the processing and long-term storage of data. This allows for additional storage capacity to be added to the system without upgrading the portable computer itself. Preferably, the additional processor and memory could eliminate or reduce one or more limitations in performance of audio/video playback by the portable computer. An entertainment system with a processor upgrade could enhance and improve the capabilities of the portable computer, as portable computers have a typically smaller size and thus have smaller hardware components more limited in function and capability than larger hardware components. In preferred embodiments, the docking station has at least 1 GB of memory, although greater amounts of storage are preferred.

The docking station could also have a video screen that receives electronic signals through a hard-wired or wireless signal (e.g., IR or RF signals) from the portable computer. For example, the video screen could be used to display information/images. A preferred video screen is a touch screen that sends input commands to and from the portable computer in lieu of the portable computer's native interface. Additionally, the video screen could be used in communication with the media entertainment system to regulate operation of the system and the portable computer.

The docking station could also have at least one cradle that is sized and dimensioned to receive the portable computer within the docking station. Preferably, two or more cradles could be included, with each cradle configured to receive distinct computers. The cradle could include a locking member that engages or disengages the portable computer to the docking station to facilitate nondestructive engagement of the portable computer to the docking station. Thus, in the case of multiple docking stations dispersed within a multi-zone system, a plurality of different portable computers could be utilized, with each engaged to a separate docking station.

Various objects, features, aspects and advantages of the inventive subject matter will become more apparent from the following detailed description of preferred embodiments, along with the accompanying drawings in which like numerals represent like components.

DETAILED DESCRIPTION

The drawings shown herein are for the purposes of illustrating the preferred embodiments of the present invention and are not meant to limit in any respect the various aspects of the present invention described in this specification.

Figure 1:
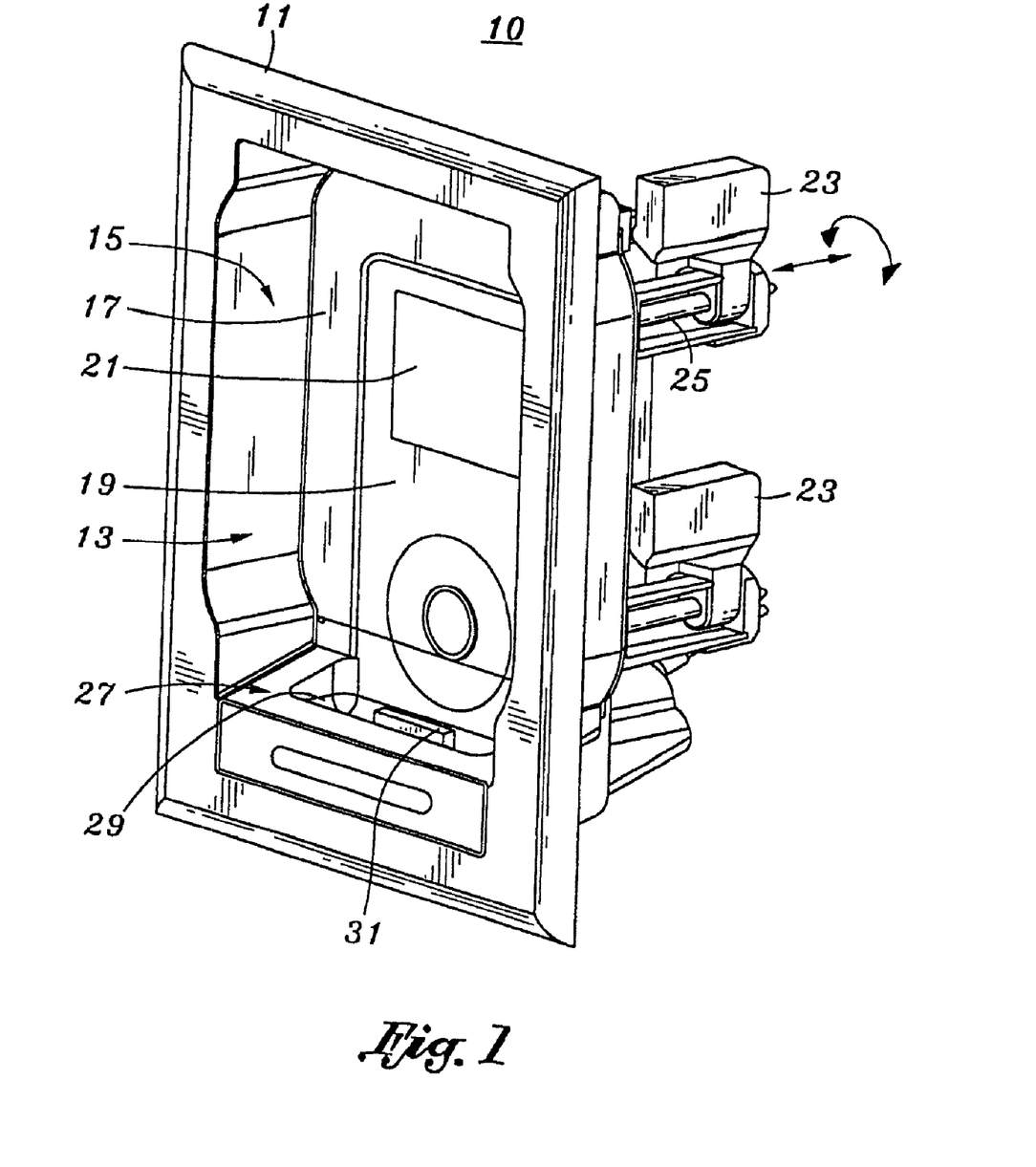
FIG. 1 is a front perspective view of a docking station.
Figure 2:
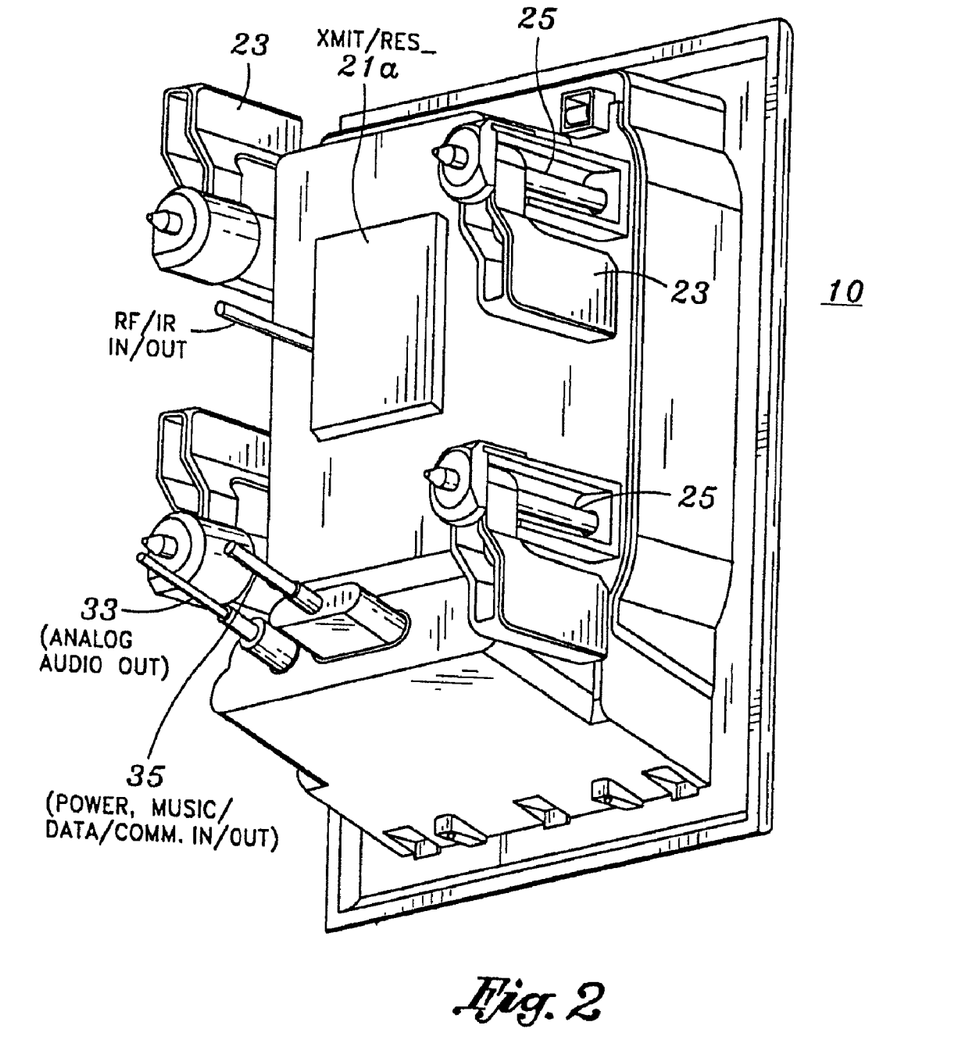
FIG. 2 is a rear perspective view of a docking station.

FIGS. 1 and 2 illustrate front and rear perspective views, respectively, of an embodiment of a docking station 10. Referring to FIG. 1, the docking station 10 can receive and engage a portable computer including for example, portable computer 20 illustrated in FIG. 3. The docking station 10 includes a mounting frame 11 composed to define a dock receiving well 13, into which the portable computer can be inserted. The mounting frame 11 further defines interior side walls 15 and back wall 17. A back plate 19 is disposed against the back wall 17, which could optionally be a decorative plate, or support a transmitter and receiver or transceiver 21. Transceiver 21 functions to transmit/receive signals to and from the portable computer, respectively, whether the portable computer is located in or away from docking station 10. As shown in FIG. 2, a transceiver 21a could alternatively be formed on a rear surface of the docking station. Transceiver 21, 21a can implement contemporary wireless protocols including for example, 802.11 and Bluetooth, to wirelessly communicate data with a portable computer.

The docking station 10 further comprises a plurality of rotatable/translatable engaging members 23 which are connected to the mounting frame 11 by fasteners 25. The engaging members, or "dawgs" 23, can be rotated to extend outwardly from the mounting frame 11, and can be translated towards the mounting frame by rotation of fasteners 25. Thus, the engaging members can be brought closer to the mounting frame to capture an intervening wall surface, which secures the docking station against the wall surface.

Referring to FIG. 1, the docking station 10 includes a cradle 27 which composes a dock engaging well 29. The dock engaging well is preferably sized and configured to receive and support a portable computer. Preferably, cradle 27 is replaceable with differently sized cradles to conform to the particular portable computer to be inserted.

A first interface 31 is disposed within the dock engaging well 29, and operative to electrically engage a mating connector on the portable computer. Engagement of the first interface 31 to the portable computer defines an electrical interface connection between the docking station 10 and the portable computer, whereby data can be communicated with the portable computer when it is disposed within docking station 10.

Referring to FIG. 2, exemplary electrical connections to the first interface 31 are shown. In the presently preferred embodiment, electrical connections to the first interface 31 include analog audio connector 33 and power/data connector 35. Analog audio connector 33 operates to port analog output signals from the portable computer to the media entertainment system. In the preferred embodiment, power/data connector 35 ports power to the portable computer and communicates data from the portable computer. Connectors 33 and 35 are in electrical communication with the first interface 31, shown in FIG. 1.

Figure 3:
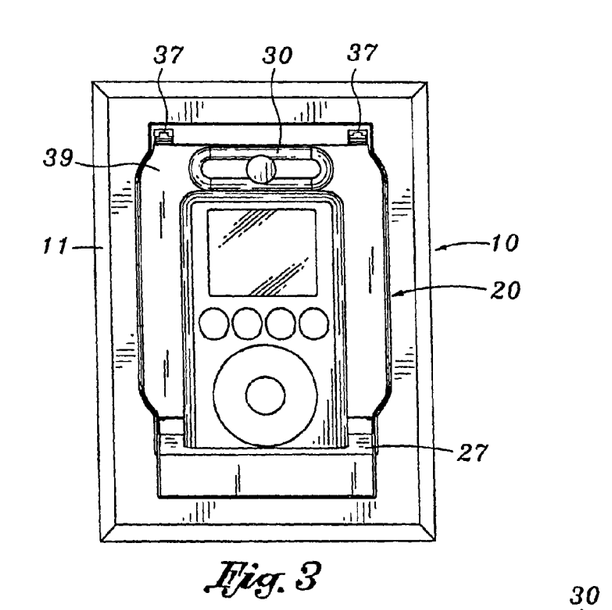
FIG. 3 is a front view of a docking station housing a portable computer, with an infrared receiving module thereon.

FIG. 3 illustrates a front view of docking station 10, within which a portable computer 20 is disposed. The portable computer 20 includes an infrared receiving module 30, which is mounted upon and electrically engaged to the portable computer 20. As noted above, different portable computers can have different sizes, shapes, and electrical connectors. The docking station 10 comprises engaging members 37, which facilitate receiving and engaging back plate 39 within the docking station.

Figure 4:
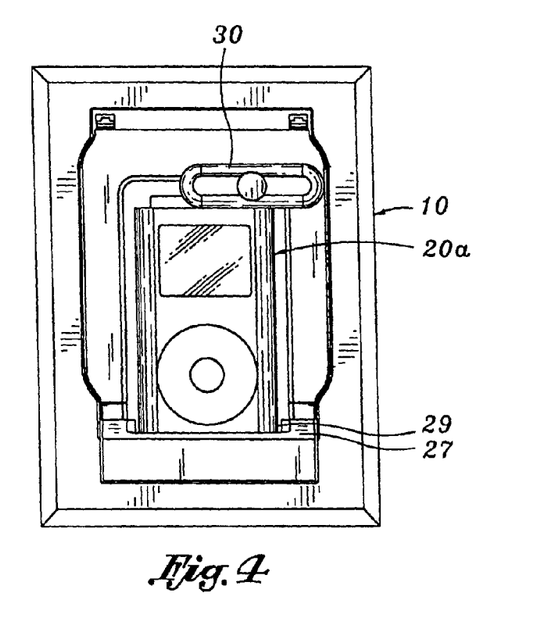
FIG. 4 is a front view of the docking station, as illustrated in FIG. 3, wherein the infrared receiving module is oriented offset from center of the portable computer.

FIG. 4 illustrates the docking station 10 being used with a different portable computer 20a. The structure of portable computer 20a requires the infrared receiving module 30 to be mounted at a different location. Moreover, because cradle 27 defines a dock engaging well 29 larger than the portable computer 20a, cradle 27 can be replaced with an alternate cradle (not shown) that conforms to portable computer 20a.

When the portable computer 20 having IR receiver module 30 or a RF receiver (not shown) is disposed within the docking station 10, the portable computer can be commanded by wireless signals communicated from transceiver 21 or 21a to control the portable computer. As explained below, such configuration allows control of the portable computer without the need for deriving electrical interface protocols for each computer used with the docking station. Infrared module 30 can be implemented as a component of a commercially available IR controller (e.g., the NaviPod™ IR remote marketed by Apple™, Inc., which includes the infrared receive module 30 and a handheld transmitter). The handheld transmitter can be directed towards the transceiver 21 or 21a to input infrared commands that operate the portable computer. Those commands could be learned by any media system controller of any suitable type, for example the Sonance DAB 1 media system controller. Consequently, when a user desires to regulate the operation of the portable computer (e.g., to change songs), the media system controller can be directed to generate an appropriate command which is communicated to transceiver 21 or 21a and wirelessly broadcast to the infrared module 30, which in turn communicates the appropriate command to the portable computer.

The infrared commands can similarly be learned by and communicated to a media system controller by in-wall controllers, for example the Sonance K2 controller, which includes an infrared receiver and manual input circuit, both of which communicate to the media system controller to direct the media system controller to generate appropriate commands. Those commands could then be communicated to the transceiver 21, 21a to regulate the operation of the portable computer 20, via transmission to the infrared receiving module 30.

Figure 5:
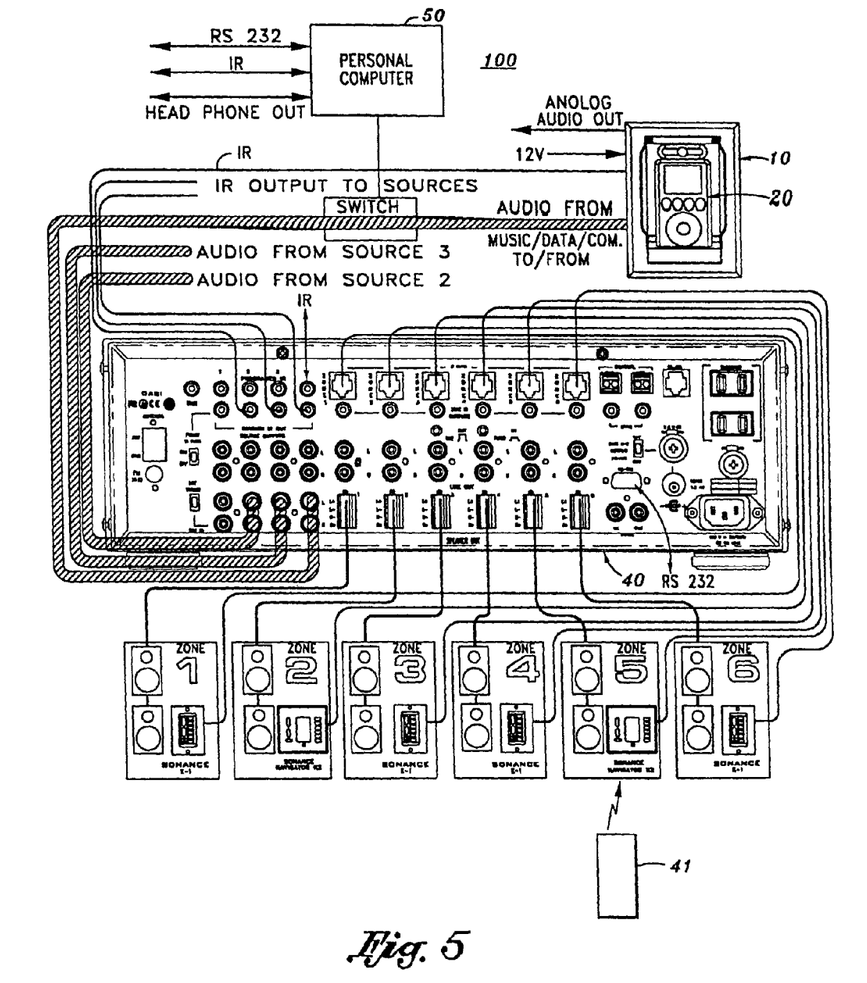
FIG. 5 is a wiring diagram illustrating connection of the docking station within a multi-zone audio system.

FIG. 5 illustrates an exemplary wiring arrangement for integrating the portable computer within connecting dock 10 within a multi-zone entertainment system 100. As shown at FIG. 5, the media system controller 40 supports a plurality of audio zones, e.g. six zones. The controller 40 selectively distributes audio output to audio speakers (e.g., in-wall or in-ceiling speakers) disposed in any or all of the zones. Moreover, each zone is shown to include a keypad controller, which can be implemented as, for example, Sonance Navigator K1 controllers or Sonance Navigator K2 controllers marketed by Dana Innovations. Each of the controllers includes a keypad for inputting commands to regulate the operation of the media system controller 40. The K2 in-wall controllers shown in zones 2, 4 and 5 can further include a display and/or receiver (e.g., IR, RF or FM) operative to receive commands, such as from a handheld having a receiving/learning circuit therein. The user can therefore regulate the operation of the portable computer and the distribution of music to any or all zones, by operation of a portable transmitter used in the vicinity of any in-wall controller having an IR, RF or FM receiving circuit. As such, a user can place a portable computer within one of a plurality of docking stations, distributed about a multi-zone audio system, and be able to control music played by the portable computer from any room/zone by either manually operating any accessible keypad, or directing a transmitter towards a receiving keypad or dedicated receiver from any zone within the system.

As will be recognized by those skilled in the art, command sets communicated to the portable computer by infrared transmission can be limited to a small group of commands. More refined control of the portable computer can be affected by manually operating the portable computer as it is disposed within the connecting dock, or by learning more detailed electrical for communication to the portable computer via the first interface 31 (see FIG. 1). However, for many purposes the infrared command set can be sufficient for regulating operation of the portable computer, while avoiding complexities associated with deriving device specific electrical protocols.

Where more sophisticated regulation or operation is desired appropriate electrical protocols can be derived for two-way electrical communication between the portable computer and the media system controller 40 and/or personal computer 50.

Personal computer 50 functions to receive and store music or other files from the portable computer 20, or to port media or files to the portable computer 20. The personal computer 50 can also be used to port commands or an instruction set to the portable computer 20 for storage within flash memory. The instruction set functions to facilitate communication between the portable computer 20 and either the personal computer 50 or the media system controller 40.

The personal computer 50 can also communicate electrical or infrared commands or control signals to the media system controller 40. In the case of digital control signals, such signals can be communicated to an RS 232 input of the media system controller 40. Infrared command signals can be communicated to an infrared input port of the media system controller. Analog output signals from the personal computer 50 could be ported from the personal computer headphone jack to an appropriate audio source input to the media system controller 40.

Figure 6:
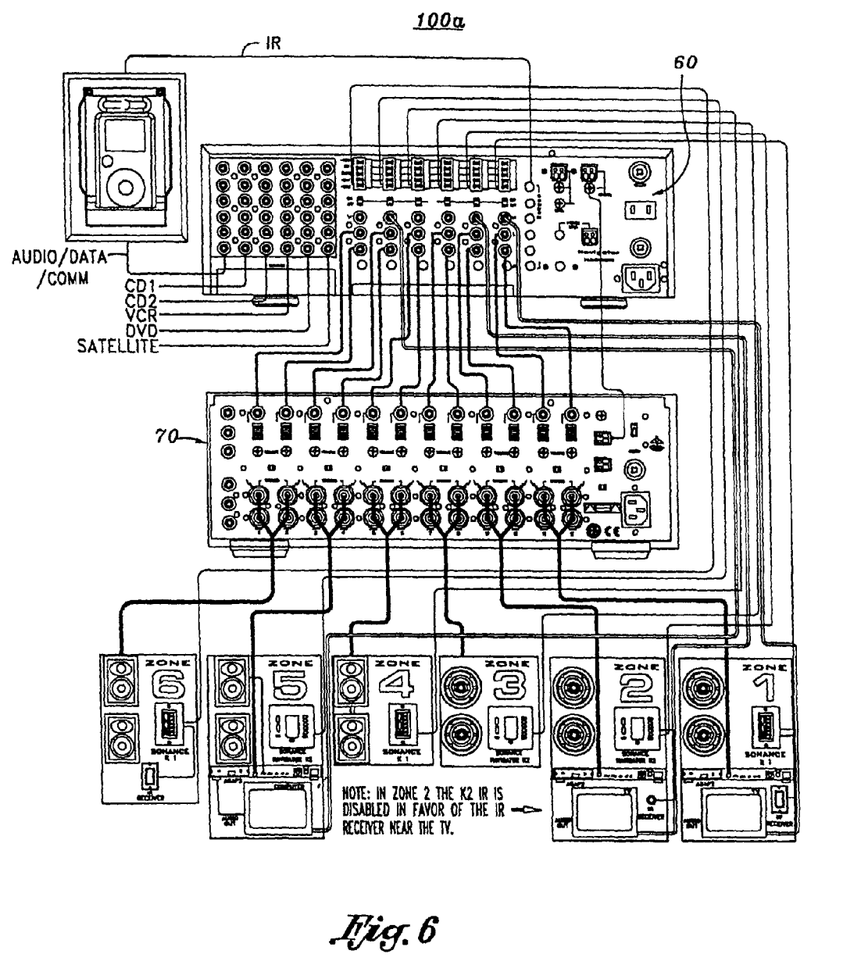
FIG. 6 is a wiring diagram illustrating connection of the docking station to an alternate implementation of a multi-zone audio/video system.

FIG. 6 illustrates wiring arrangement for an alternate implementation of the multi-zone entertainment system 100a, useful to support audio and video sources/outputs. As shown therein the system controller is implemented to incorporate a separate switching device 60, which is connected to an amplifier 65. In a preferred embodiment, the switching device 60 could be implemented as the Sonance Navigator Harbor, and the amplifier 65 could be implemented as the Sonance Model 1230 amplifier. Some of the zones are also shown to include video devices, see zones 1, 2 and 5. Some zones can further include a separate IR receiver (see zones 1, 2 and 6, for example). The remaining portions of the multi-zone entertainment system 100a operate in substantially the same manner as described in connection with the entertainment system 100 illustrated at FIG. 5.

Figures 7, 8:
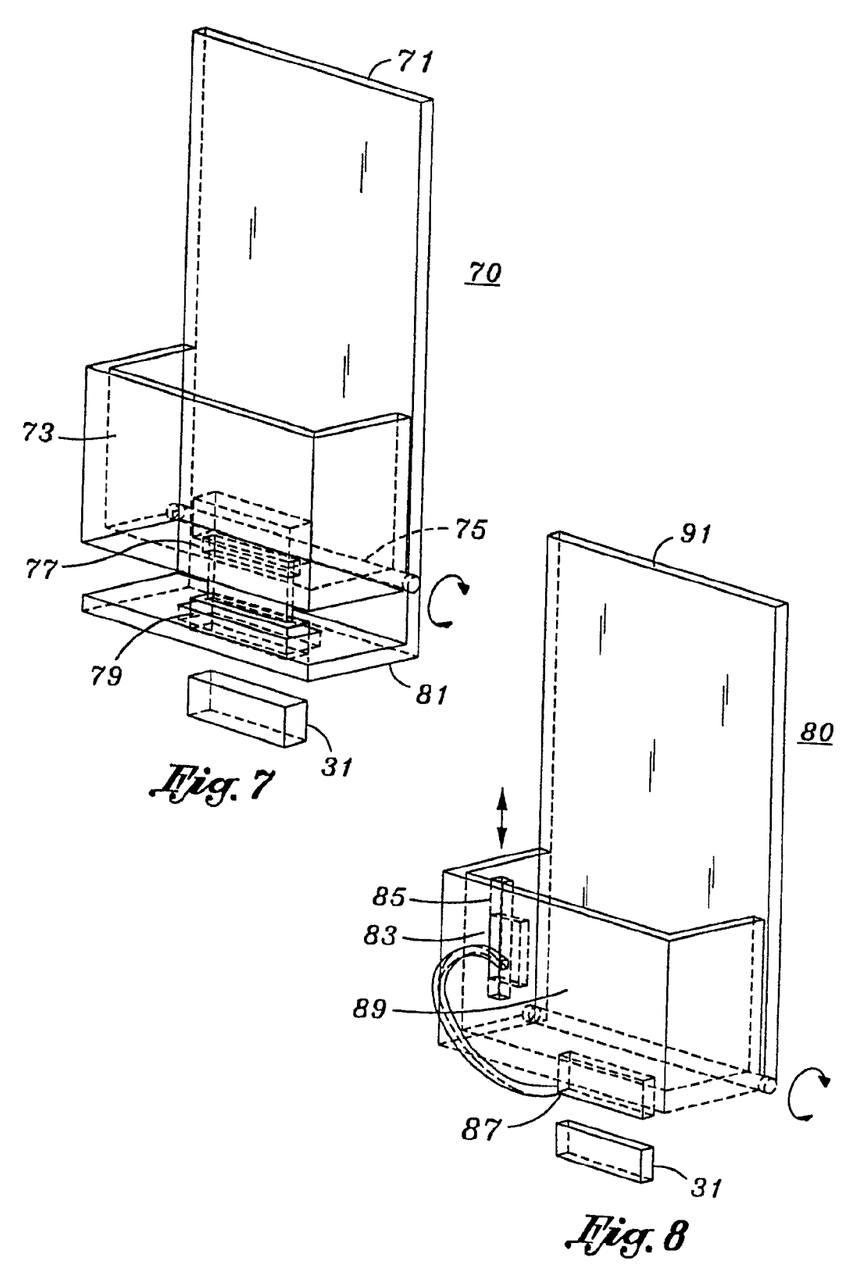
FIG. 7 is an illustration of a portable computer adaptor for interfacing the portable computers to the docking station.
FIG. 8 is an illustration of an alternate portable computer adapter.

FIGS. 7 and 8 illustrate adapter brackets that can be used to facilitate engagement of the portable computer to the docking station. As noted above, in some case particular portable computers can be formed to have electrical interfaces disposed at different locations, such as along the side edge of the device. In those cases an adapter is useful to facilitate interface of a model specific portable computer to the docking station. Moreover, even where the portable computer incorporates a conveniently located electrical interface, an adapter bracket can be useful to facilitate engagement of the portable computer to the docking station, without stressing the electrical connector port of the portable computer upon repeated engagement to the connecting dock. The adapters are directed to providing such additional advantages to the docking station and the entertainment system described above.

FIG. 7 is a perspective view of an adapter bracket 70 formed to receive a portable computer, and to facilitate engagement of the portable computer to the docking station 10. Bracket 70 incorporates an adapter back wall 71 and a translating receiving bracket 73. The bracket 73 is connected to a translating member or hinge 75, such that the bracket 73 is rotatable from the closed position (shown) to an open position wherein greater space is available to insert the portable computer into the bracket. The bracket incorporates a connector 77, translatable with the bracket 73, for electrically engaging to the portable computer. Connector 77 in turn is connected to connector 79, which is formed on bracket lower surface 81. Connector 79 in turn is engageable to the first interface 31, shown at FIG. 1.

FIG. 8 illustrates an alternate adapter bracket 80, formed to accommodate portable computers having electrical interfaces formed on a side surface thereof. As shown in FIG. 8 connector 83 is arranged for electrical connection with such a portable computer. Connector 83 is translatable within channel 85 in order to accommodate portable computers having side facing electrical interfaces, arranged at different vertical locations on the side surface of the portable computer. Connector 83 is further connected to connector 87, which in turn is engageable to the first interface 31, also shown at FIG. 1. As with the adapter bracket shown in FIG. 7, adapter bracket 80 includes a translating receiving bracket 89, pivotally engaged to an adapter back wall 91 via a translating member or hinge 93.

Accordingly, the adapter brackets shown in FIGS. 7 and 8 can receive different types of portable computers, whereby a range of portable computers can be mechanically and electrically engaged to the adapter bracket for convenient interface to the docking station 10.

Figure 9A:
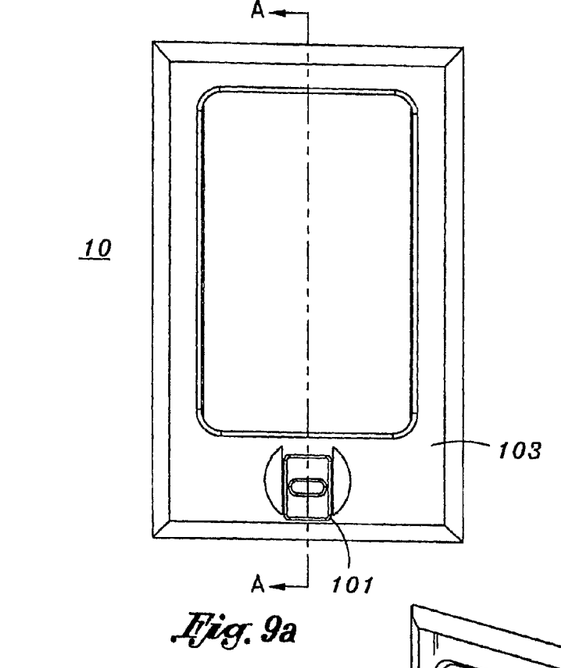
FIGS. 9a, b and c are front, sectional and perspective views, respectively, of an alternate docking station, having a portable computer releasing lever formed on the front surface thereof.
Figure 9B:
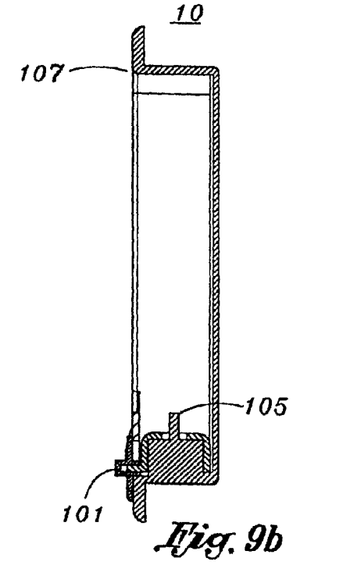
Figure 9C:
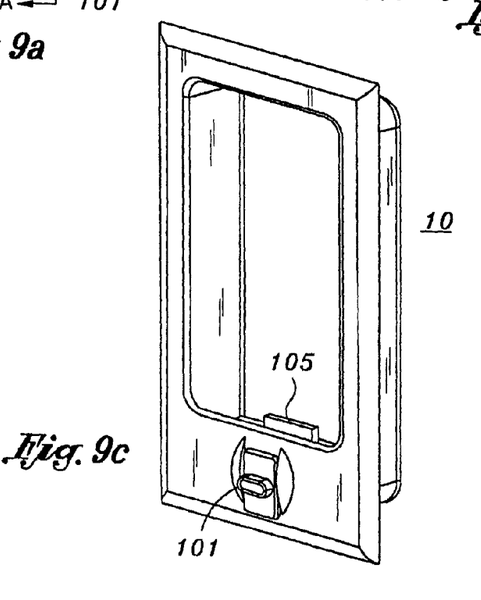

FIGS. 9a, 9b and 9c illustrate another enhancement of the docking station. As shown therein the docking station 10 incorporates a lever 101 disposed on the front surface 103. The lever 101 is manually translatable to urge the portable computer, when disposed within the docking station 10, upward and outward to facilitate removal of the portable computer from the docking station 10. More particularly, vertical translation of the lever 101 urges flange 105 upward against the portable computer, and urges the portable computer into contact with directing member 107. The directing member 107 is formed to urge an upward translating portable computer to be directed out of docking station 10, where it is more conveniently grasped by a user and removed from the docking station.

Translation of lever 101 further functions to disengage the electrical connection between the portable computer and the back connection port without the need for manually docking the portable computer or other motions that can contribute to deterioration of the dock connecting port or the electrical interface of the portable computer.

Figure 10A:
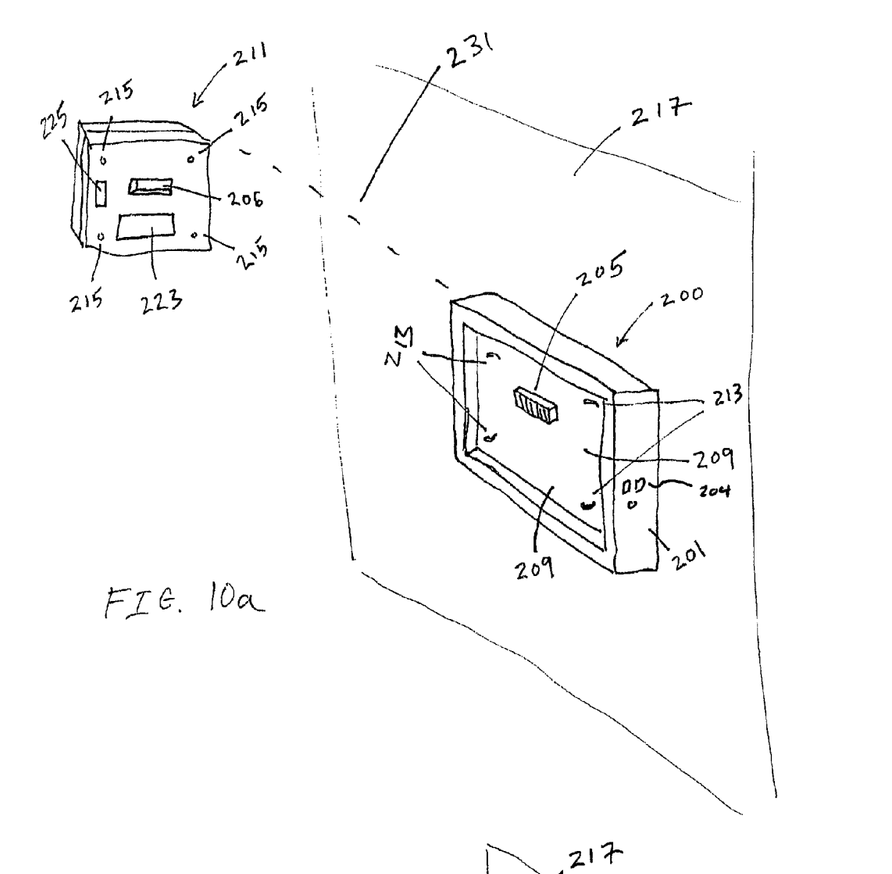
FIG. 10a is a perspective view of a wall-mounted docking station and a portable computer uncoupled from one another.
Figure 10B:
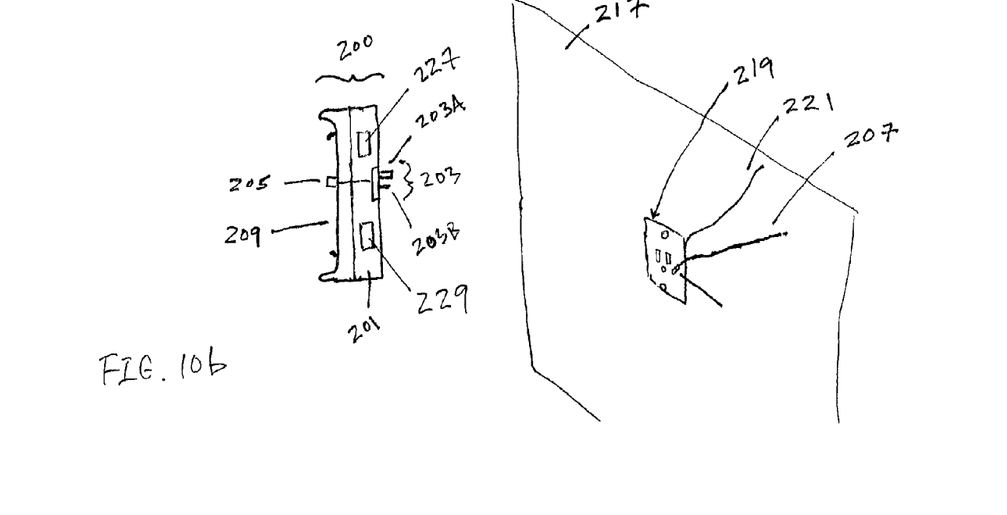
FIG. 10b is a perspective view of the wall-mounted docking station of FIG. 10a uncoupled from the wallboard.

FIGS. 10a-10b illustrate an exemplary wall-mountable docking station 200 comprising a wall-mount 201, a first interface 205, and a second interface 203.

Docking station 200 has a cradle 209 defining a cavity sized and dimensioned to receive a portable computer 211. It is contemplated that differently sized and dimensioned cradles can be interchanged with cradle 209 to receive portable computers having different dimensions than that of portable computer 211. Docking station 200 comprises releasable couplings 213 that engage the portable computer and securely attach it to the docking station. Any suitable commercially available fasteners are contemplated including for example, couplings 213 that conform to receiving wells 215 on the portable computer. Preferably, the releasable couplings mate with the portable computer as the portable computer is placed within the cradle. In other contemplated embodiments, docking station can have spring-loaded tabs (not shown) that partially or fully cover the cavity when the portable computer is placed within the cradle, thereby securing the portable computer within the docking station. In further contemplated embodiments, fasteners can include for example, hook and loop fasteners, clasps, clips, snaps, magnets, belts, and any combination thereof.

Docking station 200 also includes a processor 227 and memory 229 that cooperate to add functionality to the docking station. For example, the docking station could store media files or a set of initialization commands. Any suitable processor or memory could be used with docking station 200. Preferably, the docking station includes at least 1 GB, 2 GB, 5 GB, or 10 GB of memory of any type, for example read-only memory (ROM), random access memory (RAM), and Flash memory. Since docking station 200 has its own processor and memory, docking station 200 could optionally function as a media control center without a portable computer mounted to the docking station. Preferably, docking station 200 has a separate user interface (not shown) from the portable computer that can be used whether or not a portable computer is mounted to the docking station.

Figure 11A:
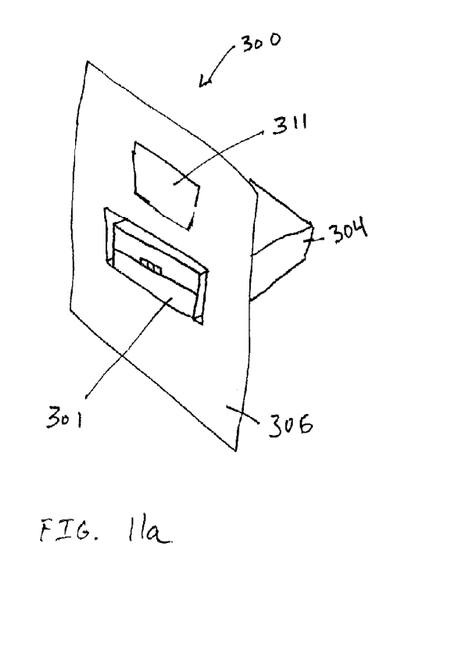
FIGS. 11a-11c are front perspective, front planar, and rear perspective views of an alternate docking station.
Figure 11B:
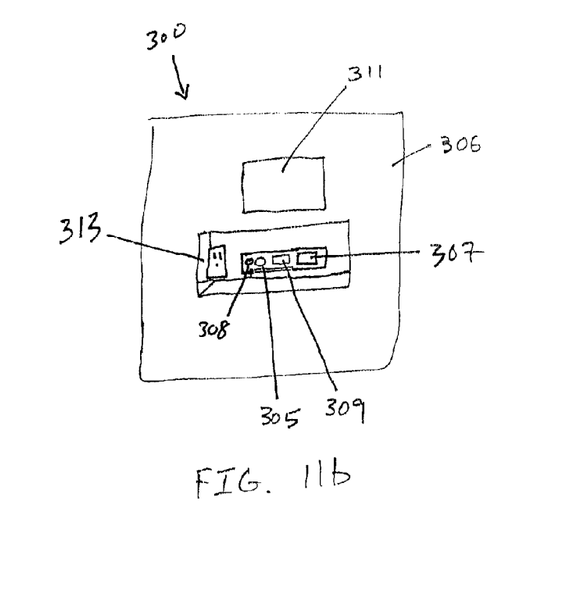
Figure 11C:
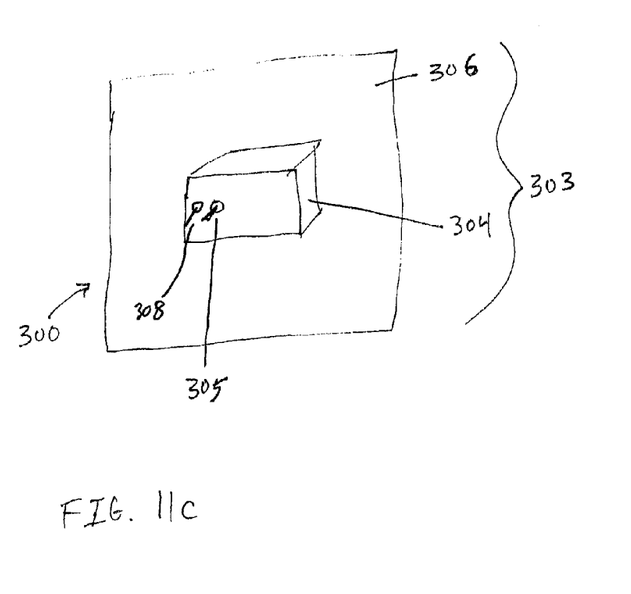

Docking station 200 is mounted to the wall via wall-mount 201. Wall-mount 201 is mounted to wallboard 217 by plugging the second interface 203 into a wall outlet 219 in the wallboard. Wall-mount 201 could be securely fastened to the wall outlet 219 by one or more fasteners (not shown). Contemplated fasteners include for example, screws, nails, bolts, and those listed above in reference to releasable couplings 213. Wall-mount 201 preferably also have rubber or otherwise elastic "feet" (not shown) that prevent the docking station from marking up the wallboard during mounting. An alternate embodiment of wall-mount is shown in FIGS. 11a-11c.

First interface 205 can include any commercially available interface including for example, USB, serial, firewire, proprietary interfaces, and other docking station electrical connectors. While first interface 205 comprises a male serial connector that mates with a female serial connector 206, the type, shape, and location of the electrical connectors can vary. First interface 205 is disposed within docking station 200 and acts as a conduit through which data is sent/received between portable computer 211 and docking station 200. While first interface 205 is preferably an electrical connector disposed within the cradle, the first interface could also be disposed on an exterior wall of the docking station or coupled to the docking station via a hard-wired or wireless connection. As shown in FIG. 10b, first interface 205 is directly hard-wired to second interface 203 to enable first interface to provide power and data connections in a single interface. Typically, both power and data is transmitted through the first interface by allocating some serial pins towards data transfer, and other serial pins towards power transfer.

Second interface 203 is a power connector, represented in the drawing as a standard NEMA 1-15 connector that mates with a standard wall outlet 219. While second interface 203 is a standard plug having two blades 203A and preferably a cylindrical pin 203B, second interface 203 could include any male or female connector or wire, for example two cylindrical pins, three cylindrical pins, three blades, and any other plug design to allow the power connector to be coupled with a wall outlet. Second interface 203 provides both power to portable computer 211 and electronics (not shown) that allow data to be communicated over the power line 221.

While second interface is preferably a power connector that transmits both power and data to the portable computer, second interface 203 could also include any commercially available interface and electronics that facilitates sending/receiving data between the portable computer 211 and the media entertainment system (not shown). For example, the second interface could include an Ethernet connection, an IP over power line connection, and other wired connections, as well as WIFI, Bluetooth, and other wireless connections. While second interface 203 is disposed within the docking station 200, it is contemplated that the second interface be disposed outside of the docking station or coupled to the docking station via a hard-wired or wireless connection. Preferably, the second interface is set up to allow the docking station 200 to communicate with the media entertainment system (not shown) over a distance of at least 5 meters.

Portable computer 211 includes a battery 223 that can be charged by the second interface 203. It is also contemplated that portable computer 211 has electronics 225 to facilitate communication with a cellular network, which is then linked to the second interface. For example, the portable computer could be a cellular phone that, when mounted to the docking station, connects an entire house to the cellular phone. A user could then make and receive cell phone calls by using a land line that connects to the cellular phone. In an exemplary embodiment, the docking station is coupled to a cellular phone signal booster. While FIG. 10a illustrates the electronics as disposed within the portable computer 211, the electronics can be externally coupled with the portable computer such as through USB or Serial connections (not shown).

Since docking station 200 plugs directly into and thus blocks wall outlet 219, docking station 200 preferably has a power outlet 204 that allows other devices to serially receive power along with docking station 200. Preferably, power outlet 204 is attached to a fuse or other surge protecting device to prevent other devices that plug into power outlet 204 from being damaged in the event of a surge. While power outlet 204 is shown as a NEMA 1-15 female connector on the side of docking station 200, power outlet 204 could be any other type of power connector without departing from the scope of the current invention.

FIGS. 11a-11c illustrate an alternative docking station. As shown in FIGS. 11a-11c, a flush-mounted docking station 300 is mounted within a panel 306 for coupling a portable computer 301 to an entertainment system (not shown). Docking station 300 includes a wall-mount 303 configured to receive the portable computer. Docking station 300 also includes a power connector 305 that provides power to the portable computer and a second interface 308 that provides a data connection between the portable computer and the entertainment system (not shown). Alternatively, portable computer 301 could receive power from a standard power outlet 313 placed within docking station 300.

Docking station 300 comprises a mounting panel 306 and a recessed portion 304 for mounting the docking station 300 in flush engagement with a wall-board (not shown). The recessed portion 304 is inserted within the wall-board until the mounting panel 306 is in flush with the wall-board. This is advantageous as it allows the docking station 300 to appear to be "built-in" to the wall-board, and thus eliminates unsightly protrusions, etc.

Docking station 300 further comprises a wireless interface 307 that receives commands. Any commercially suited wireless interface can be used including those described above in reference to first interface 205. Preferably, the wireless interface is programmable to receive commands from different media controllers. For example, a user could program the docking station to receive commands from a television remote, a universal remote, and a stereo remote control. The control commands sent to the docking station could be processed by the docking station, or could be forwarded to the attached media systems or the portable computer.

Docking station 300 could also include a third interface 309 that provides additional functionality to portable computer 301. For example, the third interface 309 could functionally couple a processor (not shown) in the docking station with a processor (not shown) in the portable computer to improve the processing speed of the portable computer. The third interface could also couple the portable computer to a phone network to allow the portable computer to save and process audio or video conversations. Other functionalities could be added via a third interface without departing from the scope of the current invention.

Docking station 300 also includes a video screen 311 that can send and receive electronic signals from a portable computer 301 and display information. Any commercially available video screens are contemplated including for example, cathode ray tubes (CRTs), liquid crystal displays (LCDs), light-emitting diodes (LEDs), and touch screens. Video screen 311 could be of any suitable size and shape, and preferably is sized and dimensioned to allow a user to regulate operation of the entertainment system (not shown) and the portable computer 301. Preferably, video screen 311 is a touch screen that plays video data sent from the portable computer or docking station and also sends commands sent from the touch screen to the portable computer, docking station, or other remote media entertainment systems.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A docking station for functionally connecting a battery powered portable computer to a media entertainment system, comprising:
   a wall-mount that receives the computer;
   a power connector that provides power to the computer;
   a first interface that receives a media file stored with the computer; and
   a second interface that communicates the media file to the media entertainment system.

2. The docking station of claim 1, wherein at least one of the power connector, the first interface, and the second interface is hard-wired to at least one of the computer and the media entertainment system.

3. The docking station of claim 1, wherein at least two of the power connector, the first interface, and the second interface is hard-wired to at least one of the computer and the media entertainment system.

4. The docking station of claim 1, wherein at least one of the power connector, the first interface, and the second interface is connected wirelessly to at least one of the computer and the media entertainment system.

5. The docking station of claim 1, wherein the first interface is proprietary, and licensed under the control of a company.

6. The docking station of claim 1, wherein the first interface comprises a male connector that mates with a female connector on the portable computer.

7. The docking station of claim 1, wherein the computer has electronics that communicates with a cellular network.

8. The docking station of claim 1, further comprising a third interface that communicates with a phone network.

9. The docking station of claim 1, further comprising electronics capable of communicating with the media entertainment system at a distance of at least 5 meters.

10. The docking station of claim 1, further comprising a third interface that receives commands from a remote controller.

11. The docking station of claim 1, further comprising a memory of at least 1 GB and a processor.

12. The docking station of claim 1, further comprising a wire that physically connects the second interface to the media entertainment system.

13. The docking station of claim 1, wherein the second interface has electronics that runs IP over power line.

14. The docking station of claim 1, wherein the second interface comprises an Ethernet connection.

15. The docking station of claim 1, further comprising a video screen that receives electronic signals from the computer.

16. The docking station of claim 1, further comprising a first cradle and a second cradle, wherein the first cradle receives the computer, and the second cradle receives a different computer.

* * * * *